United States Patent
Nishi et al.

[11] Patent Number: 5,294,769
[45] Date of Patent: Mar. 15, 1994

[54] ELECTRIC JOINING METHOD OF MATERIAL INCLUDING CERAMICS

[75] Inventors: Tokumitsu Nishi, Osaka; Kouji Okuda, Kobe; Hiroshi Takai, Nishinomiya; Hisakiyo Hoshino, Settsu; Masashi Numano, Takatsuki; Natsumi Miyake, Toyonaka, all of Japan

[73] Assignee: Daihen Corporation, Japan

[21] Appl. No.: 867,224

[22] PCT Filed: Oct. 2, 1991

[86] PCT No.: PCT/JP91/01322
§ 371 Date: Jun. 3, 1992
§ 102(e) Date: Jun. 3, 1992

[87] PCT Pub. No.: WO92/06054
PCT Pub. Date: Apr. 16, 1992

[30] Foreign Application Priority Data

Oct. 3, 1990 [JP] Japan ................. 2-267403
Oct. 3, 1990 [JP] Japan ................. 2-267404
Apr. 16, 1991 [JP] Japan ................. 3-84109

[51] Int. Cl.$^5$ ............... C04B 37/00; C04B 37/02
[52] U.S. Cl. ............... 219/117.1; 219/118; 219/601; 219/611
[58] Field of Search .......... 219/117.1, 8.5, 9.5, 219/57, 58, 61.2, 67, 101, 104, 105, 118

[56] References Cited

U.S. PATENT DOCUMENTS

| 4,093,839 | 6/1978 | Moliterno et al. | 219/8.5 |
| 4,717,801 | 1/1988 | Brolin et al. | 219/8.5 |

FOREIGN PATENT DOCUMENTS

| 57-28682 | 2/1982 | Japan | 219/118 |
| 58-97485 | 6/1983 | Japan | 219/117.1 |
| 61-36180 | 2/1986 | Japan | |

*Primary Examiner*—Geoffrey S. Evans
*Attorney, Agent, or Firm*—Scully, Scott, Murphy & Presser

[57] ABSTRACT

The present invention provides an electric joining method of a body to be jointed including the butted portion of at least between electroconductive ceramics to be jointed or between an electroconductive ceramics and a metal to be jointed, whereby the body to be jointed is electrically jointed while the thermal stress generated at the ceramics materials to be jointed is eased. In the electric joining method according to the present invention, at least a pair of electrodes are brought to butt against the materials to be jointed holding at least one or more butted portions therebetween, with a joining agent interposed at the butted portions. Moreover, there provided are a first heating means for heating the materials to be jointed between the electrodes by Joule heat through impression of a voltage between the electrodes and, a second heating means for heating a part of said materials to be jointed and its vicinity where a large temperature gradient is formed only by the first heating means. The temperature of the butted portion is raised to a desired joining temperature while both the first and the second heating means are used together so that the thermal stress generated because of the temperature gradient at the materials to be jointed becomes smaller than the breaking stress of the materials to be jointed.

10 Claims, 7 Drawing Sheets

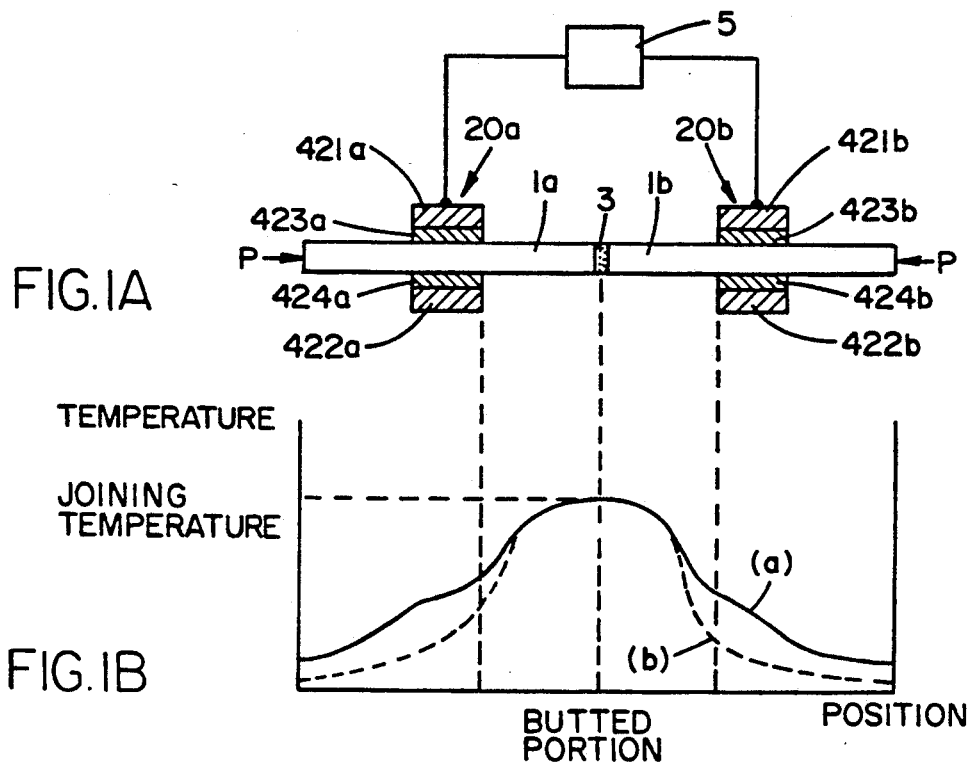
FIG.1A
FIG.1B
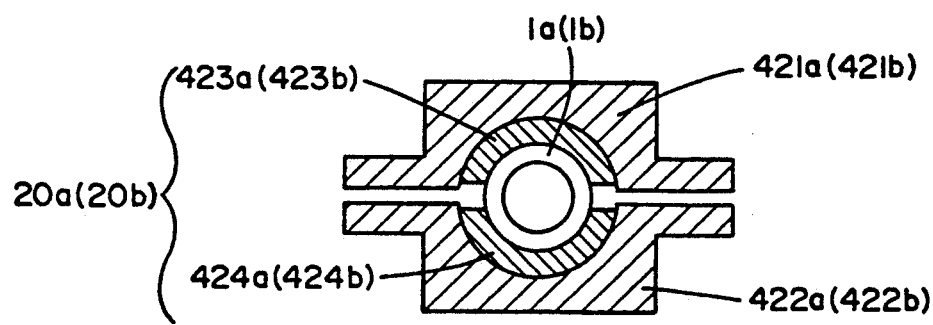
FIG.2

ELECTRIC JOINING METHOD OF MATERIAL INCLUDING CERAMICS

FIELD OF APPLICATION IN INDUSTRY

The present invention generally relates to an electric joining method and more particularly, to a method for electrically joining a body to be jointed including a butted portion at least between electroconductive ceramics to be jointed or between an electroconductive ceramics to be jointed and a metal while relieving the thermal stress generated at the ceramics to be jointed.

BACKGROUND OF THE INVENTION

Conventionally, in order to join an electroconductive ceramics with an electroconductive ceramics or a metal, a method by a direct resistance heating, a method by a high frequency inductive heating, or a combination of these methods etc. have been proposed. According to the aforementioned method by a direct resistance heating, when an body to be jointed which is composed of two materials to be jointed parts at either side of a butted portion is arranged in contact with an electrode and supplied an electric current, a Joule heat is generated at the butted portion thereby to partially heat the butted portion. Therefore, a joining agent at the butted portion is melted, whereby the to be jointed parts are jointed together. According to the method by a high frequency inductive heating, an induction coil is provided around the butted portion of the body to be jointed, and the butted portion is partially heated by Joule heat resulting from the induction heating, so that the joining agent of the butted portion is melted. Meanwhile, when the method by a direct resistance heating is used in combination with the method by a high frequency inductive heating, a ceramics of a higher resistance, namely, having a lower electrical conductivity is heated beforehand by the high frequency inductive heating to lower the resistance value (that is, to increase the conductivity). Thereafter, the direct resistance heating is carried out to flow a large amount of current to quickly heat the butted plane.

FIG. 11(A) shows the structure when the conventional method by a direct resistance heating is performed. In the structure of FIG. 11(A), conductive cylindrical ceramics $1a'$, $1b'$ to be jointed are brought to butt against each other via a joining agent $3'$, thereby constituting a butted portion. Ring-shaped electrodes $2a'$, $2b'$ are provided butting against the corresponding ceramics $1a'$, $1b'$ in a manner as indicated in the drawing. Thermal insulators $4a'$, $4b'$ are placed at the end parts of the ceramics $1a'$, $1b'$, respectively. A voltage is impressed between the electrodes $2a'$ and $2b'$ while the ceramics $1a'$, $1b'$ are pressured by a pressuring device (not shown) via the thermal insulators $4a'$, $4b'$. As a result, Joule heat is generated at the ceramics $1a'$, $1b'$ because of the flow of a current in a vertical direction to the butted plane of the ceramics $1a'$, $1b'$. Since the butted plane is partially heated by this Joule heat, the joining agent $3'$ is melted, thereby joining the ceramics $1a'$, $1b'$ together. In such a case as above where the materials to be jointed are made of the same material in the same shape and jointed with use of electrodes of a small heat capacity, since the resistance values of both materials are equal to each other, the quantities of heat generated at materials to be jointed between the electrodes $2a'$, $2b'$ become equal to each other. Accordingly, the two materials to be jointed in the vicinity of the butted portion are heated generally uniformly as is indicated by a curve (a) of FIG. 11(B) and moreover no large temperature gradient is formed to the materials to be jointed in the vicinity of the electrodes. In employing the other two joining methods described earlier, if the materials to be jointed are in the same shape and of the same material, or if the joining temperature is low, there is no particular problem to be solved.

In the meantime, the electrodes $2a'$, $2b'$ for the direct resistance heating are generally formed of heat-resisting metal such as tungsten, molybdenum or the like or inorganic material with heat-resistance such as carbon or the like. These kinds of material have a good electrical conductivity and a good thermal conductivity. For instance, if the resistance values of the materials to be jointed are the same, the heat generated at the materials to be jointed between the electrodes $2a'$ and $2b'$ during the electric current supplying leaks away to an electrode tool (not shown) and a part of the materials to be jointed except the materials between the electrodes $2a'$ and $2b'$ because of the thermal conduction. As a result, a sharp temperature gradient is brought about in a longitudinal direction in the vicinity of each material to be jointed where the corresponding electrode is mounted, as is shown in FIG. 12. The temperature gradient is said to become larger as the joining temperature becomes higher, the heating speed is faster, or the heat capacity of the electrodes or the thermal conduction of the material of the electrodes is increased.

In general, it is rather strongly needed to join the materials of different materials or in different shapes and sizes at a high joining temperature, or to join different kinds of materials with a large difference of resistance values at a high joining temperature. In such cases as above, however, the heat generated at materials each to be jointed becomes different, thereby causing a problematic temperature gradient due to the flow of the heat in the vicinity of the butted portion. In the example of FIG. 11(A), supposing that the resistance values R1, R2 of the ceramics $1a'$, $1b'$ are greatly different (R1>>R2), the heat generated at the ceramics $1a'$ not only heats the butted portion, but runs away to the ceramics $1b'$ and the electrode tool (not shown). As a consequence, a large temperature gradient is formed in the longitudinal direction of the material to be jointed at the center of the butted portion in addition to the temperature gradient generated at each material to be jointed where the electrode is mounted, as represented by a curve (b) in FIG. 11(B). The temperature gradient is regarded to be larger as the difference of the resistance values between the materials to be jointed becomes larger, the joining temperature is higher, the heating/cooling speed is faster or the heat capacity of the ceramics $1b'$ is larger. When the ceramics $1a'$, $1b'$ are heated according to the method by a high frequency inductive heating under the same conditions as above, contrary to the above, the heat is generated concentrating on the ceramics $1b'$ of a lower resistance, assuming a temperature profile shown by a curve (c) of FIG. 11(B) which is as large as the curve (b).

The thermal stress is increased in accordance with an enlargement of the temperature gradient. When the stress exceeds the breaking strength, i.e., breaking stress of the materials to be jointed, the materials to be jointed crack and break up. If the joining temperature is raised when the temperature gradient is large, the maximum temperature of the material to be jointed which generates more heat than the other material to be jointed or the peak temperature becomes much higher than the temperature of the butted portion. Therefore, a part of the ceramics at the maximum temperature may be disadvantageously decomposed or the similar deterioration of material may be brought about. This restriction of the joining temperature is an obstruction to the use of a heat-proof material, etc. Moreover, the distance between the electrodes is difficult to be shortened and the heating speed cannot be accelerated, whereby a further electric energy is required for joining and the running cost is increased.

In the combined use of the method by a direct resistance heating and method by a high frequency inductive heating, the ceramics of a higher resistance is processed through the high frequency inductive heating so as to lower the resistance value thereof (to increase the electric conductivity) before the direct resistance heating is performed. This prior art has been employed to lower the resistance values of ceramics materials with an aim to increase the electric current for the case where the ceramics of high resistance values at room temperatures are electrically jointed together. Therefore, if the technique is applied to electric joining of two materials to be jointed of different resistance values, since the resistance between the electrodes is determined by the resistance value of the ceramics of a higher resistance, it is necessary to heat the ceramics of the higher resistance. However, when a section astride the two ceramics is subjected to the high frequency inductive heating, the ceramics of a lower resistance is mainly heated, and the electric power for the high frequency inductive heating should be increased in order to heat the ceramics of the higher resistance. If the electric power is raised, the ceramics of the lower resistance is heated further and the temperature gradient of the two ceramics becomes large. The ceramics may be broken. Therefore, if the high frequency inductive heating is used with the direct resistance heating for the purpose of increasing the electrical conductivity without considering the temperature gradient, generation of cracks due to the thermal stress resulting from the temperature gradient cannot be avoided.

SUMMARY OF THE INVENTION

The object of the present invention is therefore to provide an electric joining method of a body to be jointed including a butted portion between electroconductive ceramics or between an electroconductive ceramics and a metal.

Pursuant to the present invention, a pair of electrodes are arranged in pressed contact with material or element to be jointed holding at least one butted portion therebetween, with a joining agent interposed at the butted portion, thereby forming a first heating means. The materials or elements between the electrodes are heated by a Joule heat generated through impression of a voltage between the electrodes. Moreover, a second heating means is provided for heating a part of the materials and its vicinity where a large temperature gradient is formed through heating by the first heating means, so that the thermal stress generated at the materials is made smaller than the breaking stress of the materials. The temperature of the butted portion is raised to a joining temperature while the first and second heating means are used jointly.

In greater detail, the second heating means is an electrode-heating means which heats a part or the whole part of the electrodes through resistance heating thereby to make small the temperature gradient formed at the materials where the electrodes are mounted and its vicinity.

In greater detail, the second heating means is a low-resistant-material heating means to heat the material of the low resistance among the materials to be jointed.

In greater detail, the second heating means is a combination of the electrode-heating means and the low-resistant-material heating means.

In greater detail, the electrode-heating means is formed by raising the electric resistance of a part or the whole part of the electrodes.

In greater detail, one of the first heating means and the low-resistant-material heating means is used until the temperature of the butted portion reaches a predetermined temperature, and then, both the first heating means and the low-resistant-material heating means are used together.

In greater detail, both the first heating means and the low-resistant-material heating means are used together from the start of the heating.

In greater detail, the low-resistant-material heating means is a high frequency inductive heating apparatus.

When the electrode-heating means of the second heating means is used, since the ceramics materials where the electrodes are mounted and its vicinity are positively heated from the start of the electric current supplying, the large temperature gradient generated in a longitudinal direction of the materials between the electrodes and in the vicinity of the electrodes can be eased.

In the case where the materials of different resistance values are to be jointed together, if the materials are heated only by the first heating means to the joining temperature through impression of a voltage between the electrodes, a large temperature gradient is given rise to at the materials in the vicinity of the butted portion. However, if the low-resistant-material heating means of the second heating means is used to heat the material of the lower resistance, the temperature at each part of the materials between the electrodes is raised by the heat from both heating means. Particularly, the heat gained by the low-resistant-material heating means works to ease the temperature gradient (to reduce the thermal stress) in the vicinity of the butted portion of the materials. Therefore, generation of cracks due to the large temperature gradient can be prevented. Moreover, when the joining temperature is obtained by the heat from both heating means, as compared with the case where it is obtained by one heating means, the quantity of heat added to each material from both heating means can be reduced. As a result, the maximum heating temperature of the materials can be controlled low in comparison with the conventional method. Deterioration of the ceramics materials due to the overheating can be accordingly prevented.

Furthermore, since both heating means is used jointly, it is fit to the difference of physical properties, size or shape of the materials. If the two heating means is used together from the start of the heating, heating is effectively conducted in a shorter time while generation of cracks and deterioration of the materials are prevented. When a direct high frequency inductive heating means is employed for the second heating means, the low resistance material can be heated directly, realizing considerably effective heating as a whole and reducing the joining cost.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1(A) is a schematic structural diagram of an equipment for executing a first embodiment of the present invention;

FIG. 1(B) is a diagram of the temperature profile in a longitudinal direction of an material to be jointed when the first embodiment is executed;

FIG. 2 is a schematic side view of the equipment for executing the first embodiment of the present invention;

DETAILED DESCRIPTION OF THE PREFERRED EMBODIMENTS

Embodiment 1

Figure 3A:
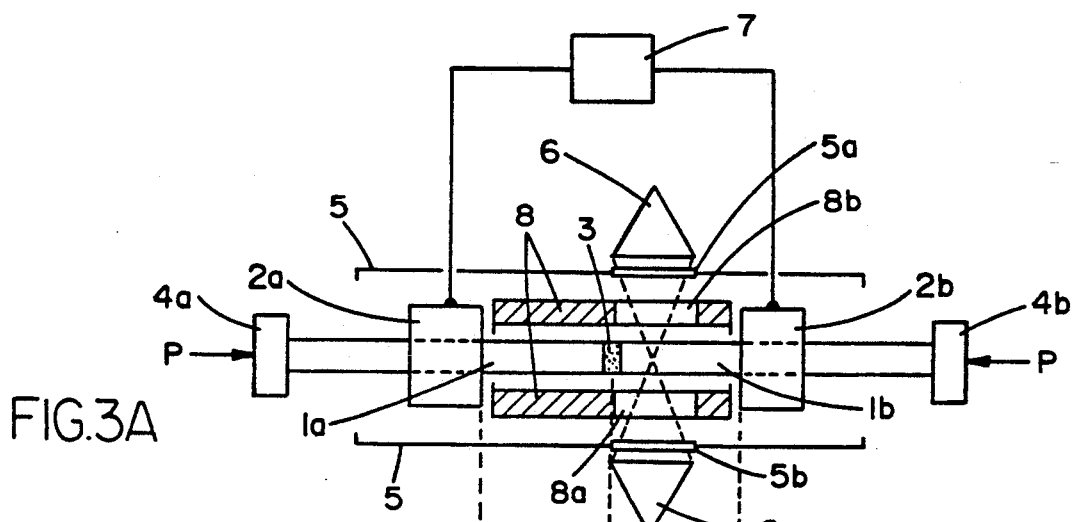
FIG. 3(A) is a schematic structural diagram of an equipment for executing a second embodiment of the present invention.

FIGS. 1(A) and 2 schematically illustrate a front view and a side view of an equipment for executing a joining method according to a first embodiment of the present invention. According to the instant embodiment, two pipe-like materials of the same size composing a body to be jointed are jointed together. More specifically, a joining agent 3 of Silicon-based brazing alloy is interposed between recrystallized SiC ceramics 1a and 1b ($10\phi \times 5\phi \times 100$ mm) which are the two materials to be jointed, and a suitable pressure P is impressed to fix the materials.

Next, an electrode 20a is prepared to be detachable from the material. The electrode 20a is comprised of carbon electrode 421a, 422a each of which has an inner peripheral surface thereof formed semi-circular and, resistance heater 423a, 424a made of recrystallized SiC. The resistance heater 423a, 424a which are obtained by cutting a 10 mm-long pipe in half are secured to the inner peripheries of the corresponding electrode 421a, 422a. In the same manner as above, an electrode 20b comprised of electrode 421b, 422b and resistance heater 423b, 424b is prepared. These electrodes 20a, 20b are separated 30 mm away in opposite directions from the butted portion 3, where they are tightly secured to the ceramics 1a, 1b. Although a fastening means is not shown in FIG. 2, a known suitable means is employable to tightly secure each electrode 20a, 20b. Moreover, the conductive resistance heater of the instant embodiment assume approximately ⅓ the resistivity of the ceramics to be jointed. A first heating means is constituted of a power source equipment 5 and electrodes 20a, 20b for the direct resistance heating, while a second heating means is formed of the power source equipment 5 and conductive resistance heater 423a, 424a, 423b, 424b to heat the electrode part.

With using Ar gas as the joining atmosphere, a voltage is impressed between the electrodes 20a, 20b connected to the power source equipment 5 to gradually increase the running current so that the temperature is raised with the rate 80° C./min. The joining temperature 1500° C. is achieved with about 38A. After the joining temperature is kept at 1500° C. for 5 minutes or so, the current is gradually decreased and the joining temperature is lowered to room temperatures with the rate of 80° C./min. Joining is completed. In this case, the heat is generated at the conductive resistance heater 423a, 424a, 423b, 424b because of the supplied current from the initial stage, and this heat is transmitted to the ceramics 1a, 1b where the electrodes 20a, 20b are mounted. At the same time, Joule heat is generated at the ceramics 1a, 1b. The temperature profile when the desired joining temperature is obtained is as indicated by a curve (a) in FIG. 1(B), which is considerably moderate as compared with a curve (b) in the same diagram of the prior art.

The joint body is cut 120 mm long centering the butted portion. After a three-point bending test, the joint body is found to have the strength of approximately 420 kgf/cm². Moreover, when the longitudinal cutting plane of the jointed body is ground and then inspected through an optical microscope, no crack is detected. For comparison, carbon of the same shape as the above resistance heater are mounted instead and the ceramics are jointed together under the same conditions as above. The result of the three-point bending test of the comparative example shows the presence of cracks about 5–10 mm from the electrodes. The jointed body is broken approximately at the position of the cracks, and only 53 kgf/cm² strength is achieved.

In EMBODIMENT 1 above, although the conductive resistance heater are used as the second heating means to heat the electrodes, it is similarly effective to form the electrodes with an increased resistance due to a reduced sectional area, or in the structure of electrode system made of a material having a large resistivity. It is apparent that the above arrangements may be used solely or jointly. The necessary heat for the heating means differs depending on the thermal properties, e.g., size or material strength and the joining temperature etc. However, too much heat is wasteful, and therefore the heat is desirable to be restricted as small as possible within the tolerance of the thermal stress. Moreover, although the electrodes are arranged at either side of the butted portion in the instant EMBODIMENT 1, the present invention may be applied to every electrode or some of the electrodes when three or more materials are to be jointed so long as the thermal stress affords it.

EMBODIMENT 2

FIG. 3(A) is a schematic structural diagram of an equipment for executing a second embodiment of the present invention, specifically, when two pipe-shaped materials of the same size, but different resistivities are to be jointed. Concretely, SiC ceramics 1a, 1b each having the outer diameter 10 mm, inner diameter 5 mm and length 100 mm are arranged to butt each other with a joining agent 3 of Silicon-based brazing alloy intervened therebetween. The SiC ceramics 1a, 1b have the resistivities in the place of about $10^0[\Omega.cm]$ and $10^{-2}[\Omega.cm]$, respectively. In other words, the difference of the resistivities of the two materials is by more than two digits. A pair of ring-shaped carbon electrodes 2a, 2b, 10 mm wide in a diametrical direction, are tightly attached to the outer peripheral surfaces of the ceramics 1a, 1b. Each electrode 2a, 2b is separated 30 mm away from the butted portion of the ceramics 1a, 1b. A suitable pressure P is added to thermal insulators 4a, 4b at the ends of the ceramics 1a, 1b by a pressuring device (not shown), thereby to impress a predetermined pressure to the butting surface of the ceramics 1a, 1b. The ceramics 1a, 1b are made rotatable by a rotary mechanism (not shown). A first heating means for the direct resistance heating is comprised of a power source equipment 7 and the electrodes 2a, 2b.

Although it is schematically shown in FIG. 3(A), a chamber 5 surrounds at least the electrodes 2a, 2b and the intermediate part therebetween air-tightly. An inert gas such as Ar gas is filled inside the chamber 5. A light beam from a halogen-lamp heater 6 passes through a windows made from a quartz glass 5a, 5b formed at a part of the chamber 5. A low-resistant-material heating means of the second heating means, that is, to mainly heat the ceramics 1b of a lower resistance is constituted of the halogen-lamp heater 6 and a power source equipment (not shown). The halogen-lamp heater 6 is provided corresponding to a part where the temperature gradient of the ceramics 1a, 1b becomes large when the joining temperature of the butted portion is raised to a desired temperature only by the electric current supplying between the electrodes 2a and 2b. In other words, the halogen-lamp heater 6 is provided to heat the above part thereby to make the temperature gradient small. A generally cylindrical thermal insulator 8 covers almost all the intermediate part of the electrodes 2a, 2b, having a apertures 8a, 8b formed corresponding to the windows made from a quartz glass 5a, 5b so as to pass the light from the halogen-lamp heater 6. It is needless to say that the apertures 8a, 8b may be formed of the windows from a quartz glass. According to the present embodiment, the halogen-lamp heater 6, windows made from a quartz glasses 5a, 5b and apertures 8a, 8b are so positioned as to auxiliary heat a part adjacent to the butted portion of the ceramics 1b of the lower resistance.

The joining process according to the Embodiment 2 will be depicted now.

Figure 3B:
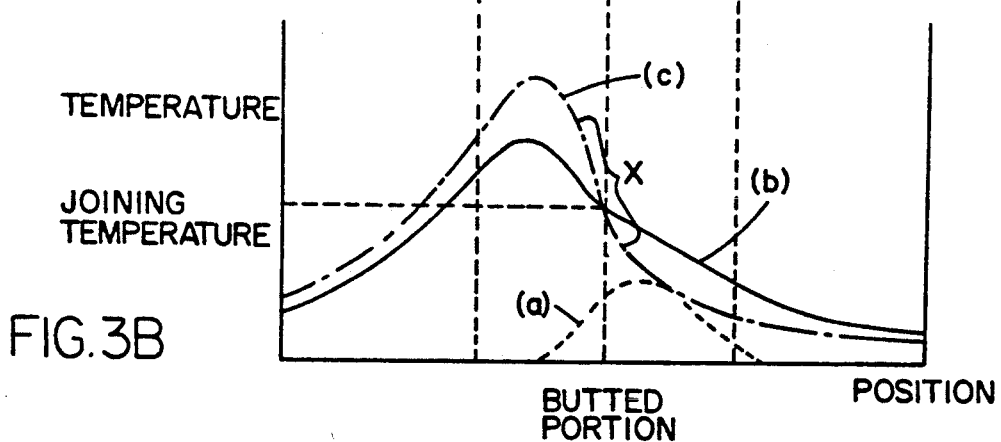
FIG. 3(B) is a diagram of the temperature profile in a longitudinal direction of an material to be jointed when the second embodiment is executed.

In the present embodiment, although the first and second heating means are used jointly, heating by the second heating means is conducted first. After the butted portion is heated to some extent, heating by the first heating means is performed. More specifically, before the electric current supplying to the electrodes 2a, 2b, a spot light having the diameter of about 10 mm is emitted to a part 3 mm closer to the ceramics 1b from the butted portion through the windows made from a quartz glasses 5a, 5b of the chamber 5 by the halogen-lamp heater 6. When the temperature of the ceramics 1b at the center of the spot light reaches a desired temperature, for example, 1000° C., a voltage is impressed between the electrodes 2a, 2b and the power source equipment 7 is controlled, whereby the electric current is gradually increased so that the temperature is raised with the rate or speed of 80° C./min. The auxiliary heating is continued according to the present embodiment even after the current supplying to the electrodes are started. When the electric current is about 32A and the joining temperature becomes 1500° C., this state is kept for about 5 minutes. Thereafter, the electric current fed to the electrodes and also heating by the halogen-lamp heater 6 are gradually restricted. The rate of the temperature drop at this time is 80° C./min. By stopping the electric current supplying to the electrodes and the auxiliary heating to lower the temperature to room temperatures, joining is completed. In this case, the temperature profile when the desired temperature to start the electric current supplying is achieved only by the halogen-lamp heater 6 is as shown by a curve (a) in FIG. 3(B), while the temperature profile when the temperature of the butted portion reaches the desired joining temperature after the start of the electric current supplying to the electrodes is as indicated by a curve (b) in FIG. 3(B). For comparison, the temperature profile when only the electric current supplying to the electrodes are used for heating without the halogen-lamp heater 6 is represented by a curve (c) in FIG. 3(B). In comparing the curves (b) and (c), the temperature gradient at the part X where the temperature gradient was considerably large in the conventional method is turned moderate according to the instant embodiment. Moreover, the maximum heating temperature of the ceramics 1a of a higher resistance is found to be lowered. Needless to say, the temperature profile at every time point during the heating and cooling processes should be such that the resulting thermal stress at each part is not larger than the breaking stress of the part.

A sample is obtained 120 mm long from the above-jointed body of ceramics 1a, 1b centering the butted portion. From the result of the three-point bending test of the sample in the state as it is cut out, approximately 340 kgf/cm² strength is confirmed. Moreover, when the sample is cut in a longitudinal direction and the cut surface is polished for inspection by an optical microscope, the presence of a crack is not observed. When the similar test is conducted to a jointed body which is jointed according to the conventional method without using the second heating means, a cracks is present about 5-10 mm from the butting surface of the ceramics 1a of a higher resistance. Further, the three-point bending test of the conventional sample results in a break at almost the same position as the above crack. The strength of the comparative sample is merely 50 kgf/cm² or so.

EMBODIMENT 3

Figure 4:
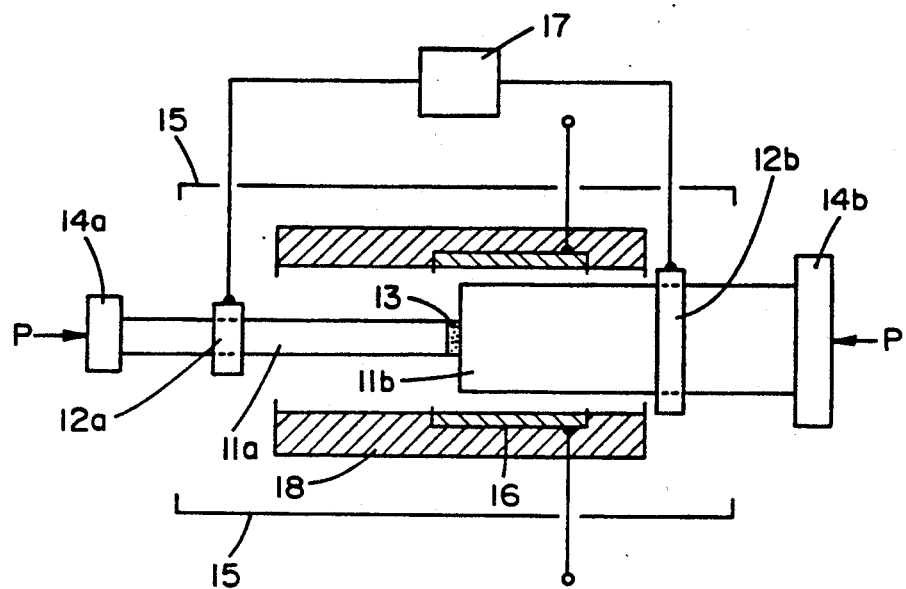
FIG. 4 is a schematic structural diagram of an equipment for executing a third embodiment of the present invention.

FIG. 4 is a schematic structural diagram for executing a third embodiment of the present invention. According to the third embodiment, two materials one in the form of a pipe and the other in the form of a circular cylinder, of the same material are jointed. In FIG. 4, the same parts as in FIG. 3 are designated by reference numerals obtained by adding ten to the corresponding numerals of FIG. 3, for example, 1a in FIG. 3 is represented by 11a in FIG. 4. A ceramics materials 11a to be jointed is an SiC ceramics in the form of a pipe having the outer diameter 10 mm, inner diameter 5 mm and length 100 mm. The other ceramics material 11b to be jointed is an SiC ceramics in the form of a circular cylinder having the outer diameter 20 mm and length 100 mm. A Silicon-based brazing alloy is used as a joining agent 13. Similar to the EMBODIMENT 2, an appropriate pressure P is impressed to the materials 11a, 11b via heat thermal insulators 14a, 14b. Although the ceramics 11a, 11b are made of the material having the same resistivity, the cross-section areas thereof are different from one another. Therefore, the resistance value is greatly different between the ceramics 11a and 11b.

The halogen-lamp heater is used as a low-resistant-material heating means of the second heating means in EMBODIMENT 2. In contrast, according to the instant embodiment, a cylindrical resistance furnace having a carbon heater 16 fixed to the inner periphery of a cylindrical thermal insulator 18 is employed as a heating source for the heating means of a low-resistant-material heating means of the second heating means. The resistance furnace is so arranged that the center of the carbon heater 16 in a longitudinal direction is about 10 mm distant from the butting surface of the ceramics material 11b of a larger cross-section area. A heating source of the carbon heater 16 is not indicated in the drawing. A pair of electrodes 12a, 12b connected to a power source equipment 17 are tightly mounted to the outer peripheral surfaces of the ceramics materials 11a, 11b, and are separated 50 mm from the butted portion. Similar to EMBODIMENT 1, Ar gas is sealed within a chamber 15.

The joining process according to the instant embodiment will be described hereinbelow.

The carbon heater 16 is heated by the heating source (not shown) to heat a part of the ceramics 11b about 10 mm from the butting surface to 1000° C. or so. When the temperature there becomes 1000° C., a voltage is impressed between the electrodes 12a and 12b, and the power source equipment 17 is controlled to raise the temperature with the rate 80° C./min. by gradually increasing the electric current. Heating by the carbon heater 16 is continued even after the start of the current supplying to the electrodes 12a, 12b. When the joining temperature reaches 1500° C. with the electric current of about 35A, this state is held for about five minutes. Then, the electric current to the electrodes 12a, 12b and carbon heater 16 is gradually decreased, thereby lowering the temperature to room temperatures with the rate of 80° C./min. Thereafter, the electric current is stopped and joining is finished. When the resultant jointed ceramics are subjected to the same test as in EMBODIMENT 1, it is confirmed that the ceramics body is a good one without cracks. Moreover, when the same ceramics materials 11a, 11b are jointed without using the second heating means for comparison, a crack is generated when the joining temperature is raised, and the two ceramics materials are separated at the part of the crack.

Accordingly, it is possible to control the thermal stress acting on the ceramics materials when the ceramics materials are jointed since the ceramics material of a lower resistance with less generation of Joule heat is mainly heated by the low-resistant-material heating means of the second heating means from the start to the end of the electric current supplying to the electrodes. The ceramics materials are prevented from being broken, and moreover, the maximum heating temperature of the ceramics material of a larger resistance is made lower. In this manner, a good jointed body can be obtained without deterioration of the material. Furthermore, since the distance between the electrodes and the joining time can be shortened, the running cost by the power consumption is saved. Resistance heating according to the present invention makes it possible to join the materials of greatly different resistance values or the cross-section areas of which are extremely different at a high temperature. A favorable temperature profile is formed at the joining time owing to the difference of thermal properties, e.g., resistivity and coefficient of linear expansion etc., thereby effectively suppressing the residual stress.

According to the instant embodiment, the auxiliary heating is first carried out by the low-resistant-material heating means of the second heating means, followed by heating by the first heating means to the joining temperature. However, heating may be conducted in the reverse order, or both heating means can be used simultaneously.

EMBODIMENT 4

Figure 5:
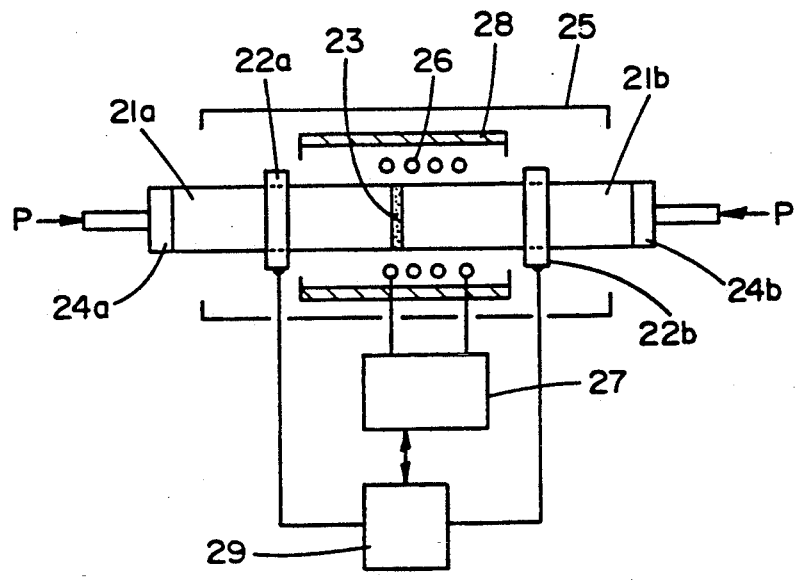
FIG. 5 is a schematic structural diagram of an equipment for executing a fourth embodiment of the present invention.

Hereinbelow, a further embodiment of the present invention using a high frequency inductive heating equipment as a low-resistant-material heating means of the second heating means will be depicted. FIG. 5 schematically illustrates the structure when a direct high frequency inductive heating equipment is used. In FIG. 5 alike, the same parts as in FIG. 3 are designated by reference numbers obtained by adding 20 to the corresponding numerals of FIG. 3. An induction coil 26 of the equipment is controlled by a source unit 27. The induction coil 26 is made of a copper pipe cooled by water thereinside, and so provided as to surround the periphery of a ceramics material (metal) 21b of a lower resistance from the butted portion.

Specifically, a ceramics material 21a to be jointed is an SiC ceramics of high resistance (having resistivity of about $10^{-1} \Omega.cm$) with the outer diameter of 10 mm, inner diameter of 5 mm and length of 200 mm. The other ceramics material 21b to be jointed is an SiC ceramics of low resistance (having resistivity of about $10^{-3} \Omega.cm$) with the outer diameter of 10 mm, inner diameter of 5 mm and length of 200 mm. A joining agent 23 is a mixture of a SiC/Si/C/binder. A ring-shaped carbon electrode 22a is provided about 50 mm away from the butted portion of the ceramics material 21a, while a carbon electrode 22b in the same form is provided at an end of the ceramics material 21b. The reason why the electrode 22b is arranged at the end of the ceramics material 21b, different from the schematic diagram of FIG. 5, is that, since almost all the electric power to be consumed through the electric current supplying to the electrodes is generated within the ceramics material 21a of the high resistance, the electrode 22a is set as close as possible to the butted portion and the electrode 22b of the lower resistance is placed at such a position as not to hinder the induction coil 26 and to reduce the cooling effect of an electrode tool. It is needless to say that the electrode 22b may be arranged symmetric to the electrode 22a as indicated in FIG. 5.

Now, the joining process will be depicted.

Figure 6:
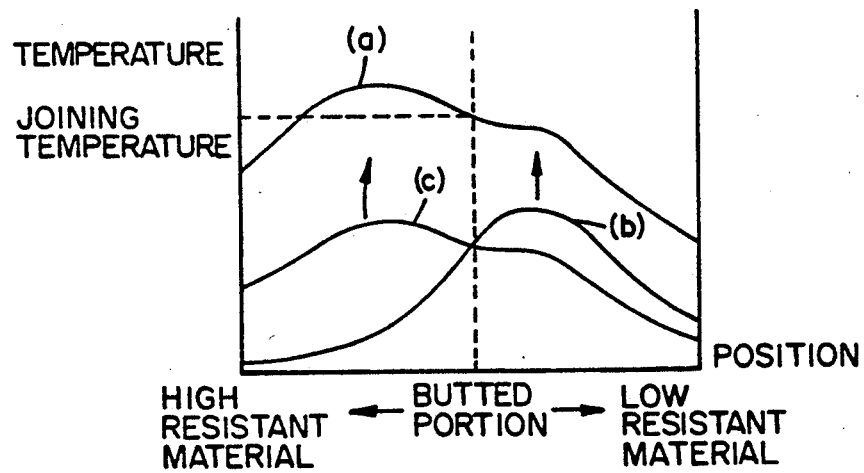
FIG. 6 is a diagram of the temperature profile in a longitudinal direction of an material to be jointed when the fourth embodiment is executed.

When the direct high frequency inductive heating equipment (second heating means) is used, mainly the ceramics material 21b of the lower resistance generates heat. The temperature profile at this time is expressed by a curve (b) in FIG. 6. When heating is performed only by the electric current supplying to the electrodes 22a, 22b, since the heat is generated mainly from the ceramics material 21a of the higher resistance, the heat by both heating means, namely, first and second heating means are combined and the temperature is raised to a joining temperature as shown by a curve (a). Concretely, electric current is first supplied from the source unit 27 to the induction coil 26, so that heating by the high frequency inductive heating equipment is started. This heating by the high frequency inductive heating equipment is carried out with the temperature rise rate of about 200° C./min. until the temperature of the butted portion reaches about 1000° C. The maximum heating temperature at this time is about 1200° C. at a position about 10-30 mm towards the ceramics material 21b of the lower resistance from the butted portion. In this state, the ceramics material 21a, 21b have no cracks anywhere. Subsequently, while the high frequency inductive heating is continued at a fixed rate, a voltage is impressed to the electrodes 22a, 22b connected to a power source equipment 29. Heating is continued with the temperature rise rate of about 200° C./min. until the butted portion becomes about 1450° C. After the state as above is kept for about one minute, the temperature is lowered to room temperatures in the reverse order to for heating. Thus, joining is completed. When the jointed body is cut in a longitudinal direction and the cut surface is ground, it is found as a result of the optical microscopic inspection that no crack is present at any part of the materials to be jointed. Moreover, the joint part is detected to be an elaborately fine layer, about 100 μm thick.

For comparison, the ceramics materials are joint by use of only the electric current supplying to the electrodes 22a, 22b, that is, direct resistance heating without using high frequency inductive heating is performed under the same conditions. When the butted portion becomes approximately 1400° C., a part of the ceramics material 21a near the butted portion cracks. This crack is observed through an optical microscope even after the ceramics materials 21a is cooled. In addition, when the joining temperature is 1450° C., the maximum heating temperature of the ceramics material 21a of the higher resistance shows 1850° C. or more, which indicates the deterioration of material due to the sublimation. Even when joining is carried out only by the high frequency inductive heating, cracks are similarly observed. Moreover, countless pores are found in the ceramics material 21b of a lower resistance due to the sublimation of a part of elements at the maximum heating temperature, leading to the deterioration of the material strength. As described hereinabove, if either the direct resistance heating or direct high frequency inductive heating is used solely, it is not only impossible to obtain a good jointed body, but the deterioration of material is brought about.

EMBODIMENT 5

According to EMBODIMENT 5, direct resistance heating by the first heating means is carried out first to some extent, and heating by a low-resistant-material heating means of the second heating means is added then. The structure of an equipment embodying the instant embodiment is the same as the equipment shown in FIG. 5 of EMBODIMENT 4. Therefore, a direct high frequency inductive heating equipment is employed in this embodiment as the low-resistant-material heating means. In the case where the direct resistance heating is first performed, since the ceramics material 21a of the higher resistance is mainly heated, the temperature profile in this case is opposite to the curve (b) of FIG. 6. And, when the direct high frequency inductive heating by the second heating means is added, the temperature profile becomes as indicated by the curve (a) of FIG. 6. More specifically, the butted portion is heated according to the direct resistance heating by the first heating means up to 1200° C. or so with the temperature rise rate of about 200° C./min. At this time, the middle part between the electrode 22a at the side of the ceramics material 21a of the higher resistance and butting surface is heated to the highest temperature, i.e., about 1500° C. No cracks are observed in any of the ceramics materials 21a, 21b Subsequently, while the direct resistance heating is maintained constant, the butted portion is heated up to 1450° C. or so by the second heating means through the direct high frequency inductive heating with the temperature rise rate of about 200° C./min. When the butted portion reaches about 1450° C., the state is held for about one minute, and the temperature is lowered to room temperatures in the order of steps opposite to in the above heating process. After the checking result of the joint body by the same test as in EMBODIMENT 4, favorable joining is confirmed.

EMBODIMENT 6

According to EMBODIMENT 6 described hereinbelow, both the first heating means and the low-resistant-material heating means of the second heating means are employed together from the start of heating. An equipment used here is the same as shown in FIG. 5 of EMBODIMENT 4. Therefore, a direct high frequency inductive heating equipment is used as the low-resistant-material heating means according to the instant embodiment. When the material are to be jointed with simultaneous use of the first heating means for direct resistance heating and the second heating means for high frequency inductive heating, since both ceramics materials generate heat simultaneously in the first stage of the heating process, the temperature profile will be as represented by a curve (c) in FIG. 6. Then, as heating is continued, the temperature profile is changed to the curve (a) of FIG. 6. More specifically, the electric power of the direct resistance heating is raised with the rate of about 200 W/min. and at the same time, the electric power of the high frequency inductive heating is raised with the rate of about 500 W/min. The butted portion is heated to about 1450° C. in about five minutes. When the temperature becomes 1450° C. or so, this state is held for about one minute. Then, both electric powers for the direct resistance heating and high frequency inductive heating are reduced simultaneously with the rate equal to that of the heating process, so that the temperature is lowered to room temperatures, when joining is completed. When the joining temperature is 1450° C. or so, the maximum temperature of the ceramics materials 21a of the higher resistance shows about 1600° C. It becomes clear from the similar evaluation to in EMBODIMENT 4, the jointed body has no cracks, indicative of the favorable result of joining. Moreover, the instant embodiment enables reduction of the joining time much more than EMBODIMENTS 4 and 5. Although the heating ratio of the direct resistance heating and direct high frequency inductive heating is not particularly specified, the direct resistance heating is superior in terms of the heating efficiency and therefore, it is more advantageous to use the direct resistance heating more from the viewpoint of the joining cost. If the materials to be jointed are different in the coefficient of linear expansion and the residual stress becomes a problem when the temperature is returned to room temperatures, it is good to determine the ratio of the first heating means and low-resistant-material heating means so that the material of a smaller coefficient of linear expansion is heated to a higher temperature.

In the present EMBODIMENT 6 as well as in the EMBODIMENTS 4 and 5, although the induction coil 26 is obtained by winding a coil conductor therearound to have the same diameter, if the coil conductor is wound so that the diameter of the induction coil is gradually increased as the induction coil 26 is farther from the butted portion, the part near the butted portion generates most heat through the induction heating, while the part more remote from the butted portion generates less heat. Therefore, a moderate temperature gradient is obtained. The shape of the induction coil is not necessary to be cylindrical as in the above EMBODIMENTs, but may be any so long as it assures uniform heating corresponding to the shape of the material to be jointed.

Although the induction coil 26 is arranged inside the chamber 25 in EMBODIMENTs 4–6 above, it may be possible to provide an insulating protecting tube made of quartz or the like just outside the materials to be jointed thereby to control the atmosphere. In such case, the induction coil is placed immediately outside the insulating protecting tube. Accordingly, the relative position of the induction coil to the material to be jointed can be changed easily, and the heating position can be adjusted with ease.

EMBODIMENT 7

Figure 7:
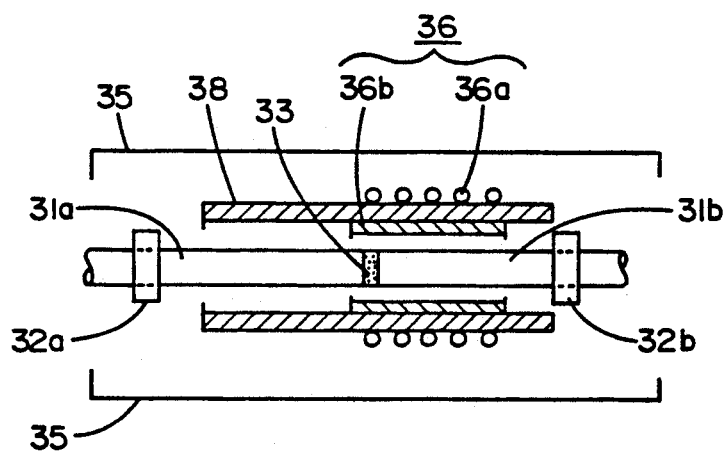
FIG. 7 is a schematic structural diagram of an equipment for executing a seventh embodiment of the present invention.

The direct high frequency inductive heating equipment is used as the low-resistant-material heating means of the second heating means in the foregoing EMBODIMENTs 4–6. According to the present EMBODIMENT 7, however, an indirect high frequency inductive heating equipment is used as the low-resistant-material heating means. In the indirect high frequency inductive heating equipment a heating element is heated through high frequency inductive heating and materials to be jointed are heated indirectly by this heating element. FIG. 7 indicates an equipment for executing the instant embodiment. The similar parts in FIG. 7 to those in FIG. 3 are designated by reference numerals obtained by adding 30 to the corresponding numerals of FIG. 3. According to EMBODIMENT 7, a cylindrical heating element heated by a high frequency electric power 36b is spaced a little gap from a ceramics material 31b of a lower resistance, and an thermal insulator 38 is provided outside the heating element 36b, and further a high frequency induction coil 36a is wound outside the thermal insulator 38. A low-resistant material heating means 36 is constituted of the induction coil 36a, heating element 36b and a power source equipment for the high frequency inductive heating (not shown). The controlling method described with reference to EMBODIMENTs 4–6 is applicable also to the instant embodiment.

EMBODIMENT 8

Figure 8A:
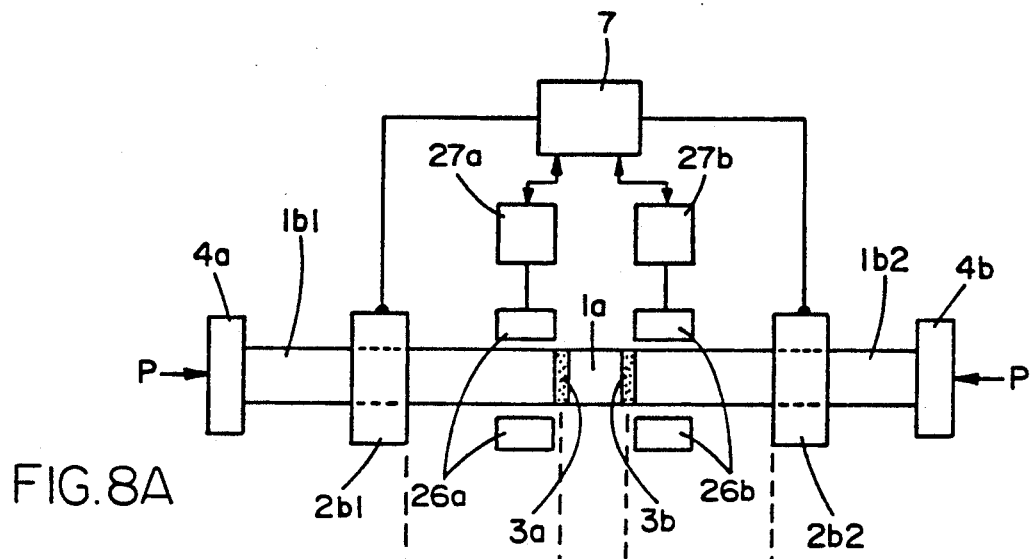
FIG. 8(A) is a schematic structural diagram of an equipment for executing an eighth embodiment of the present invention.

Two materials are jointed in the EMBODIMENTs depicted hereinabove. An applied example to join three or more conductive materials will be discussed below. As shown in FIG. 8(A), a conductive material 1a to be jointed which has jointed is placed between the materials 1b1 and 1b2 via joining agents 3a, 3b, thereby forming two butted portions. The materials 1b1, 1b2 are provided with electrodes 2b1, 2b2, respectively. A power source equipment 7 is connected to the electrodes 2b1, 2b2 for impressing a voltage to the electrodes. There are further provided two low-resistant-material heating means to heat the vicinity of the butted portions of the materials 1b1 and 1b2, each of which consists of a resistance furnace heating device, a lamp heating equipment a laser heating equipment, a gas heating equipment, a high frequency inductive heating equipment etc., namely, a heating equipment 26a, 26b and a electric power source equipment 27a, 27b.

Figure 8B:
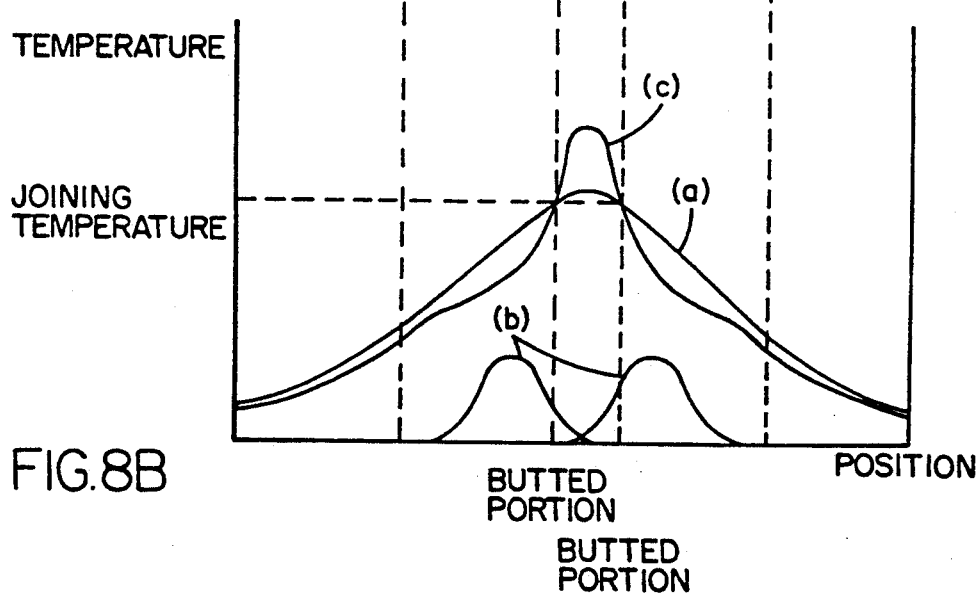
FIG. 8(B) is a diagram of the temperature profile in a longitudinal direction of an material to be jointed when the eighth embodiment is executed.

With the impression of a voltage between the electrodes 2b1 and 2b2, a electric current runs in the materials 1b1, 1a, 1b2 and joining agents 3a, 3b, whereby Joule heat is generated corresponding to each resistance value. If the resistance of the material 1a is considerably larger than that of the materials 1b1, 1b2, the temperature profile has a large temperature gradient in the vicinity of the two butted portions as indicated by a curve (c) of FIG. 8(B). Therefore, if the part near the butted portions of the materials 1b1, 1b2 of the lower resistance which generate a smaller heat value when heated by the first heating means is heated by the low-resistant-material heating means of the second heating means (a curve (b) of FIG. 8(B)), the butted portions can be heated to the necessary joining temperature while the temperature gradient is eased as shown by a curve (a), thereby preventing breakage of the materials due to the thermal stress. The low-resistant-material heating means may be a single equipment or may be designed to be two independently controllable equipment as indicated in FIG. 8. For instance, in using the high frequency inductive heating, although both the materials to be jointed 1b1, 1b2 may be heated by one induction coil and one power source equipment, it is possible to heat the materials 1b1, 1b2 by respective two independent induction coils provided in the vicinity of the butted portions, i.e., by two separate high-frequency power source. Moreover, it is also possible that one of the first heating means and the low-resistant-material heating means is started first, and the other heating means is added later at a certain temperature, or, both the heating means are controlled simultaneously to heat the butted portions to the joining temperature. If the relation of the resistance values of the materials to be jointed is reverse to the above, the temperature profile is reversed as well. In other words, the materials 1b1, 1b2 are heated by the first heating means, and the material 1a at the center is heated by the low-resistant-material heating means.

Figure 9:
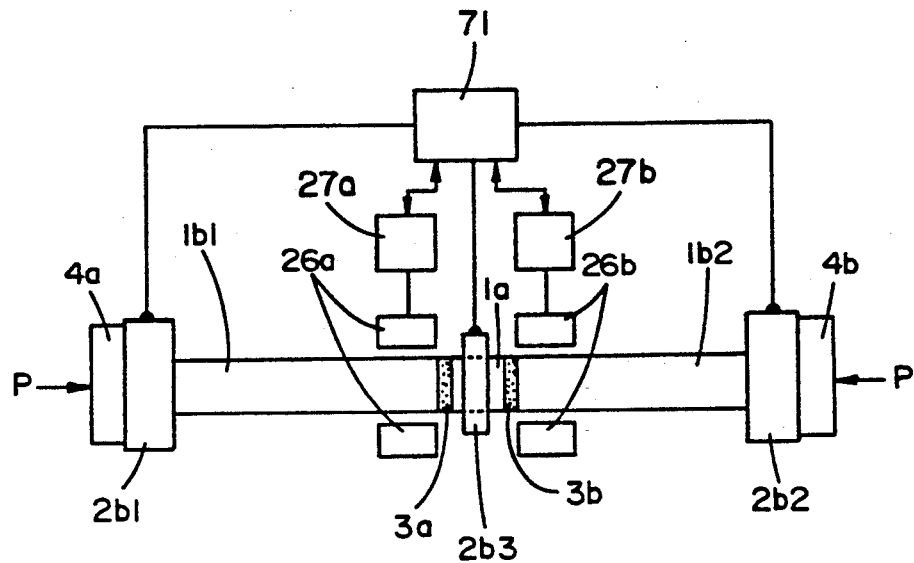
FIG. 9 is a schematic structural diagram of another equipment for executing the eighth embodiment of the present invention.
Figure 10:
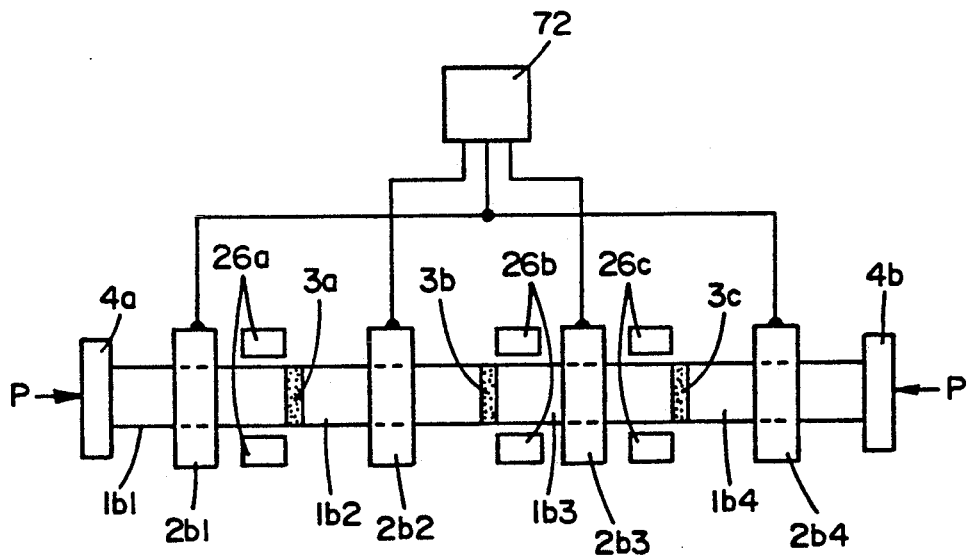
FIG. 10 is a schematic structural diagram of a further different equipment for executing the eighth embodiment of the present invention.
Figure 11A:
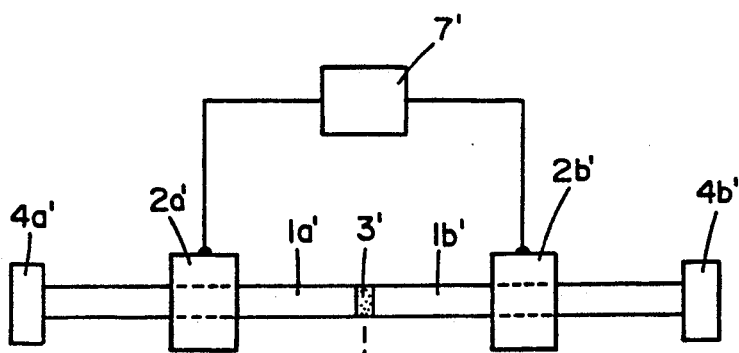
FIG. 11(A) is a schematic structural diagram of an equipment for executing a conventional method.
Figure 11B:
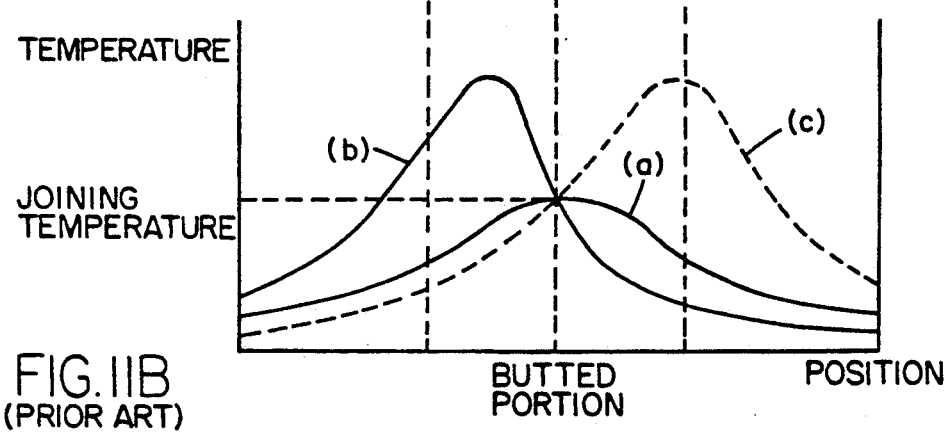
FIG. 11(B) is a diagram of the temperature profile in a longitudinal direction of an material to be jointed according to the conventional method.
Figure 12:
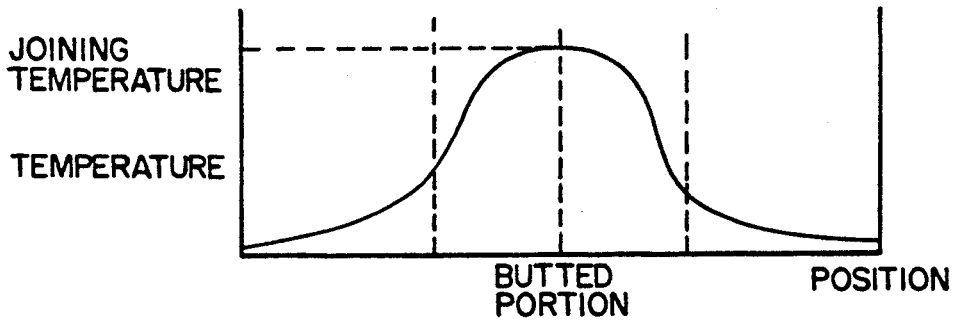
FIG. 12 is a diagram of the other temperature profile in the longitudinal direction of the material to be jointed according to the conventional method.

Although the above description is related to the case where three materials are jointed, the concept is applicable similarly to the case where the number of the materials to be jointed is increased. In such case, the materials of a lower resistance with generating less heat by the first heating means (direct resistance heating) should be heated by the low-resistant-material heating means of the second heating means. Although the electrodes as the first heating means are provided only for the materials $1b1$, $1b2$ in the foregoing embodiment and one power source equipment is used to heat the materials, it is natural that the electrodes may be provided at either side of each butted portion and controlled by two separate power source equipments. That is, the above-described modified method is carried out at two points. FIG. 9 shows an example using the power source equipment of a monophase three-wire system for the direct resistance heating as the first heating means. An electrode $2b3$ is additionally provided for the conductive material $1a$ to be jointed. The power source equipment of a monophase three-wire system 71 is connected to impress a voltage between the electrodes $2b1$ and $2b3$ and, $2b2$ and $2b3$. The electrodes $2b1$, $2b2$ are in pressed contact with end faces of the materials $1b1$, $1b2$, respectively. The other parts are in the same structure as in the above EMBODIMENTs wherein two materials are jointed. The two butted portions can be heated and jointed simultaneously according to the structure of FIG. 9. Meanwhile, FIG. 10 is an example when a polyphase power source, e.g., three-phase power source equipment is used. In FIG. 10, two materials $1b1$, $1b3$ to be jointed and two conductive materials to be jointed $1b2$, $1b4$ having a larger resistance than the materials $1b1$, $1b3$ are provided butting each other via joining agents $3a$, $3b$, $3c$, thereby forming three butted portions. The materials $1b1$, $1b2$, $1b3$, $1b4$ are provided with respective electrodes $2b1$, $2b2$, $2b3$, $2b4$ to which is connected a three-phase power source equipment 72 for impression of a voltage. In order to heat the vicinity of the butted portions of the materials $1b1$ and $1b3$ of the lower resistance, there are heating units $26a$, $26b$, $26c$. The other components of the equipment are in the same structure as in the case where the two materials are jointed as in the foregoing embodiments. Three butted portions can be heated and jointed simultaneously by this apparatus.

In the meantime, the low-resistant-material heating means of the second heating means described in EMBODIMENTs 2, 3, 7 is disadvantageously low in the heating efficiency since the heating means heats the materials indirectly. Therefore, it is desirable in considering the joining cost that heating by the low-resistant-material heating means is restricted so much as to be enough to prevent the generation of cracks resulting from the thermal stress, and instead, heating by the first heating means for the direct resistance heating which has good heating efficiency is increased. However, if there is no difference in the coefficient of linear expansion between the materials although the resistivity is different, since it is preferable from the viewpoint of the residual stress when the temperature is returned to room temperatures that the temperature profiles are similar at both sides of the butted plane when the joining agent is set, the second heating means should be used much more to make the temperature distribution small. If the coefficient of linear expansion is also different between the materials to be jointed, it is advantageous from the viewpoint of the residual stress that some degree of the temperature gradient is generated. In other words, the residual stress can be decreased by lowering the temperature of the material of a higher coefficient of linear expansion. Therefore, heating by the low-resistant-material heating means should be selected suitably depending on the difference of physical properties of the materials to be jointed and the thermal effects, i.e., leakage of heat to the electrodes or holding instrument in the surroundings of the materials to be jointed.

Since the leakage of heat to the electrode instrument in the vicinity of the electrode part of the material to be jointed which generates a large quantity of heat forms a temperature gradient in the above EMBODIMENTs 2-8, if the temperature gradient is problematic, it is necessary to reduce the heat capacity of the electrode instrument etc. as small as possible or to prevent the leakage of heat by heat insulation or the like, or to use both the electrode-heating means of the second heating means described in EMBODIMENT 1 and the low-resistant-material heating means. Although the materials are jointed in the fixed state in the foregoing EMBODIMENTs, they may be rotated to be heated uniformly in the circumferential direction. Moreover, the temperature control during the cooling process may be made in the same fashion as during the heating process described in EMBODIMENTs 4-6, but a different procedure may be possible.

The temperature profile formed at each time point during the heating and cooling processes in the EMBODIMENTs 1-8 should be such that the thermal stress at each part be not larger than the breaking stress. Since such temperature profile as above is greatly different depending on the shape, size, difference of resistance values, thermal properties or strength of the materials to be jointed, the optimum position and size of the heating elements of the second heating means, i.e., electrodes and induction coils, etc. should be selected for the kind of the material to be jointed. At the same time, the electric power to be fed by the first and second heating means, the feeding speed of the electric power and the changing rate of the temperature, etc. should be determined beforehand based on the preliminary experiments or the like.

Although the electroconductive ceramics is SiC ceramics in the foregoing embodiments, the other kind of electroconductive ceramics, for example, carbides such as ZrC, TiC, nitrides such as ZrN, TiN, borides such as $ZrB_2$, $TiB_2$, silicides such as $MoSi_2$, or composite ceramics such as $Si_3N_4$, $Al_2O_3$ including the above electroconductive ceramics or composite material with metal like cermet is possible to be jointed according to the present invention.

Moreover, although the ceramics materials are jointed together in the embodiments described so far, it is clear that the present invention is applicable to joining of a ceramics material with a metallic material. That is, since the resistance of the metallic material is generally smaller than that of the electroconductive ceramics material, the low-resistant-material in EMBODIMENTs 2-8 may be substituted with the metallic material, whereby the present invention is realized. In this case, an active metal brazing alloy or the like is employable as the joining agent. If the residual stress due to the difference of the coefficient of linear expansion should be taken into consideration, the temperature profile should be adjusted, and an intermediate material having the coefficient of linear expansion of the middle value or soft metal, e.g., Cu, Ni or the like should be inserted into the butted portion to reduce the stress.

The source devices of the first heating means (7, 17, 29, 71, 72 etc.) and power source equipment of the low-resistant-material heating means (27a, 27b, 27 etc.) can be controlled independently or interlockingly. Moreover, these power source equipments may be manually controlled or automatically controlled in accordance with the data input beforehand. Furthermore, a temperature sensor (not shown) may be provided to detect the temperature of at least one of the butted portion and the part near the butted portion, so that the signal is fed back to the source devices to control the heating speed.

According to the above embodiments, the joining agent and electrodes are made of material of low resistances to oxidization and therefore, it is necessary to prepare the inactive atmosphere or vacuum state for joining. As such, the using chambers (5, 15, 25, 35) are air-tight. However, the atmosphere may be exchanged by the flow of gas in place of the air-tight chambers. When such a joining agent and electrodes that are usable in the oxide atmosphere, for instance, oxide solder or the like are employed, it is not necessary to use the air-tight chambers as above.

INDUSTRIAL APPLICABILITY

According to the present invention, because of heating only by the direct resistance heating or direct high frequency inductive heating, the thermal stress generated at the material in the vicinity of the electrode or butted portion is eased, thereby to prevent the breakage of the ceramics material to be jointed and to obtain effectively a joint body with high heat-proof properties.

According to the invention embodied by claims 2, 4 and 5, a part or the whole part of the electrode is arranged to generate heat from the start of the electric current supplying by the electrode-heating means part of the second heating means, so that the thermal stress generated at the material in the vicinity of the electrode during joining is eased, thereby to prevent the breakage of the ceramics material to be jointed, while reducing the running cost consequent to the electric power consumption because the distance between the electrodes and the joining time can decrease.

According to the invention embodied by claims 3, 4 and 6-8, in joining the conductive materials of different resistance values, both the first heating means and the low-resistant-material heating means of the second heating means are employed so that the thermal stress generated at the materials becomes smaller than the breaking stress for raising the temperature of the butted portion to the joining temperature, and accordingly the temperature gradient of the materials in the vicinity of the butted portion is eased, thus avoiding generation of cracks resulting from a large temperature gradient. Since the heat from the two heating means is combined together to raise the joining temperature, in comparison with the case where the joining temperature is raised only by a single heating means, it is possible to add less heat from the two heating means to each material. A desired joining temperature is achieved while the maximum heating temperature of each material is restricted to be low. Moreover, the deterioration of the ceramics materials to be jointed as a consequence of overheating can be prevented. The invention is properly applied to any difference of thermal properties or shape and size of the materials to be jointed. Furthermore, if the two heating means are used concurrently from the electric current supplying, heating is carried out with good efficiency in a short time. If the direct high frequency inductive heating equipment is used as the low-resistant-material heating means, it is possible to directly heat the material of the lower resistance. Accordingly, heating is conducted considerably effectively thereby to reduce the joining cost.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electric joining method of a body to be jointed including at least one the butted portion between electroconductive ceramics elements to be jointed or/and between a electroconductive ceramics element and a metal element to be jointed, which comprises the steps of:

arranging a pair of electrodes in pressed contact with said elements to be jointed in a manner to hold said butted portion therebetween, with a joining agent interposed at said butted portion, thereby forming a first heating means;

heating said elements to be jointed between said electrodes by Joule heat through impression of a voltage between said electrodes;

heating a part and its vicinity of said elements to be jointed where a large temperature gradient is formed through heating by said first heating means by use of a second heating means so that the thermal stress generated at said elements to be jointed becomes smaller than the breaking stress of said elements to be jointed; and raising the temperature of said butted portion to a joining temperature while using said first and second heating means together.

2. An electric joining method of a body to be jointed including ceramics according to claim 1, wherein said second heating means heats a part or the whole part of a pair of electrodes constituting said first heating means through resistance heating, thereby making small the temperature gradient formed at said elements to be jointed where said electrodes are mounted and its vicinity.

3. An electric joining method of a body to be jointed including ceramics according to claim 1, wherein, when at least one of said elements to be jointed has a different resistance from the other elements to be jointed, said second heating means is a low-resistant-material heating means and heats mainly the element of a lower resistance among said elements to be jointed, thereby making small the temperature gradient formed in the vicinity of said butted portion.

4. An electric joining method of a body to be jointed including ceramics according to claim 1, wherein said second heating means is comprised of an electrode-heating means which heats a part or the whole part of a pair of electrodes constituting said first heating means through resistance heating thereby to make small the temperature gradient formed at said elements to be jointed where said electrodes are mounted and its vicinity, and a low-resistant-material heating means which, when at least one of said elements to be jointed has a different resistance from the other elements to be jointed, heats mainly the element of the lower resistance thereby to make small the temperature gradient formed in the vicinity of said butted portion.

5. An electric joining method of a body to be jointed including ceramics according to claim 3 or 4, whereby either of said first heating means and said low-resistant-material heating means is used for heating until the temperature of said butted portion reaches a predetermined temperature, and afterwards both said first heating means and said low-resistant-material heating means are used together.

6. An electric joining method of a body to be jointed including ceramics according to claim 3 or 4, wherein both said first heating means and said low-resistant-material heating means are used from the start of the electric current supplying.

7. An electric joining method of a body to be jointed including ceramics according to claim 3 or 4, wherein said low-resistant-material heating means is a high frequency inductive heating apparatus.

8. An electric joining method of a body to be jointed including ceramics according to claim 2 or 4, wherein said second heating means for heating said pair of electrodes is formed by said pair of electrodes, each of which electrodes has a reduced cross section to produce a high electrical resistance.

9. An electric joining method of a body to be jointed including ceramics according to claim 2 or 4, wherein said second heating means for heating said pair of electrodes is formed by said pair of electrodes, each of which electrodes is constructed of a material having a high specific electrical resistivity to produce a high electrical resistance.

10. An electric joining method of a body to be jointed including ceramics according to claim 2 or 4, wherein said second heating means for heating said pair of electrodes is formed by said pair of electrodes, each of which electrodes has a resistance heat generating element in contact with the electrode to produce a high electrical resistance.

* * * * *